US012775093B2

(12) United States Patent
Yoo

(10) Patent No.: US 12,775,093 B2
(45) Date of Patent: Oct. 27, 2026

(54) VEHICLE LiDAR SYSTEM AND VELOCITY MEASURING METHOD THEREOF

(71) Applicants: Hyundai Motor Company, Seoul (KR); Kia Corporation, Seoul (KR)

(72) Inventor: Min Kyun Yoo, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 1000 days.

(21) Appl. No.: 18/060,679

(22) Filed: Dec. 1, 2022

(65) Prior Publication Data

US 2023/0184946 A1 Jun. 15, 2023

(30) Foreign Application Priority Data

Dec. 9, 2021 (KR) ........................ 10-2021-0175866

(51) Int. Cl.
*G01S 17/58* (2006.01)
*G01S 17/89* (2020.01)
*G01S 17/931* (2020.01)

(52) U.S. Cl.
CPC .............. *G01S 17/58* (2013.01); *G01S 17/89* (2013.01); *G01S 17/931* (2020.01)

(58) Field of Classification Search
CPC ......... G01S 17/58; G01S 17/931; G01S 17/89
See application file for complete search history.

(56) References Cited

PUBLICATIONS

Ayush Dewan, "Motion-based Detection and Tracking in 3D LiDAR Scans", 2016 IEEE International Conference on Robotics and Automation (ICRA), May 16-21, 2016, total pp. 6.
Tianwei Yin, "Center-based 3D Object Detection and Tracking", CVPR 2021, version 1: Jun. 19, 2020, version 2: Jan. 6, 2021, total pages 10.
Ziqi Pang, "Model-free Vehicle Tracking and State Estimation in Point Cloud Sequences", arXiv:2103.06028v2 [cs.CV] Aug. 5, 2021, total pp. 8.

*Primary Examiner* — Marisa V Conlon
(74) *Attorney, Agent, or Firm* — Slater Matsil, LLP

(57) ABSTRACT

An embodiment velocity measuring method of a vehicle LiDAR system includes matching a plurality of points set to a track of a current step and a plurality of points set to a track of a previous step and determining a movement displacement of the track of the current step by measuring a movement displacement for each of the matched points and determining a final velocity value by reflecting a displacement situation according to a position of the track on a velocity value calculated based on the movement displacement.

17 Claims, 10 Drawing Sheets

VEHICLE LiDAR SYSTEM AND VELOCITY MEASURING METHOD THEREOF

CROSS-REFERENCE TO RELATED APPLICATIONS

This application claims the benefit of Korean Patent Application No. 10-2021-3175866, filed on Dec. 9, 2021, which application is hereby incorporated herein by reference.

TECHNICAL FIELD

Embodiments relate to a vehicle LiDAR system and a velocity measuring method thereof.

BACKGROUND

A LiDAR (Light Detecting And Ranging) system may assist in an autonomous driving function by obtaining information on a surrounding object such as a target vehicle using a LiDAR sensor. The LiDAR system may estimate the position of a host vehicle by using a point cloud obtained through the LiDAR sensor and may obtain information such as the position, shape, and velocity of an object around the host vehicle. However, when the information obtained using the LiDAR sensor is inaccurate or includes an error, the reliability of the autonomous driving performance may deteriorate, and thus, improvement is required.

SUMMARY

Embodiments provide a vehicle LiDAR system and a velocity measuring method thereof, capable of calculating an accurate velocity measurement value on the basis of data obtained through a LiDAR sensor.

It is to be understood that technical objects achievable by embodiments are not limited to the aforementioned technical objects and other technical objects that are not mentioned herein will be apparent from the following description to one of ordinary skill in the art to which the present invention pertains.

A velocity measuring method of a vehicle LiDAR system according to embodiments of the present invention may include matching a plurality of points set to a track of a current step and a plurality of points set to a track of a previous step and determining a movement displacement of the track of the current step by measuring a movement displacement for each of matched points and determining a final velocity value by reflecting a displacement situation according to a position of the track on a velocity value calculated on the basis of the movement displacement.

For example, the matching of the plurality of points set to the track of the current step and the plurality of points set to the track of the previous step may include calculating points of the track of the previous step on the basis of history information including at least two steps.

For example, the matching of the plurality of points set to the track of the current step and the plurality of points set to the track of the previous step may include setting at least two positions among midpoint positions of four surfaces of a measurement box of the track, a vertex position of a box closest to a host vehicle, and a tracking point position of the track, as points for measuring the movement displacement.

For example, the matching of the plurality of points set to the track of the current step and the plurality of points set to the track of the previous step may include matching a point pair in which a distance between each of the plurality of points set to the track of the current step and each of the plurality of points set to the track of the previous step is minimized.

For example, the determining of the movement displacement of the track of the current step by measuring the movement displacement for each of the matched points and determining the final velocity value by reflecting the displacement situation according to the position of the track on the velocity value calculated on the basis of the movement displacement may include determining whether the current track laterally moves, on the basis of heading information and a moving direction of the current track, to determine a final velocity value according to a lateral movement situation.

For example, the determining of the movement displacement of the track of the current step by measuring the movement displacement for each of the matched points and determining the final velocity value by reflecting the displacement situation according to the position of the track on the velocity value calculated on the basis of the movement displacement may include checking, on the basis of history information of the previous track, a region change rate of the track between steps and a movement displacement of a center point and decreasing, when the region change rate of the track and the movement displacement of the center point are equal to or greater than thresholds, a reflection rate of the corresponding track when determining the final velocity value.

For example, the determining of the movement displacement of the track of the current step by measuring the movement displacement for each of the matched points and determining the final velocity value by reflecting the displacement situation according to the position of the track on the velocity value calculated on the basis of the movement displacement may include determining whether the current track is a track positioned at a boundary of an FOV and determining the final velocity value by setting a lateral movement velocity to 0 when the current track is a track positioned at the boundary of the FOV.

For example, the determining of the movement displacement of the track of the current step by measuring the movement displacement for each of the matched points and determining the final velocity value by reflecting the displacement situation according to the position of the track on the velocity value calculated on the basis of the movement displacement may include extracting a velocity value of the track of the previous step on the basis of history information including at least two steps, assigning preset weights to a velocity value calculated on the basis of the movement displacement and a velocity value calculated on the basis of the history information, respectively, and determining a sum of weighted velocity values as the final velocity value.

In another embodiment of the present invention, a non-transitory computer-readable recording medium recorded with a program for executing a velocity measuring method of a vehicle LiDAR system may implement a function of matching a plurality of points set to a track of a current step and a plurality of points set to a track of a previous step and a function of determining a movement displacement of the track of the current step by measuring a movement displacement for each of matched points and determining a final velocity value by reflecting a displacement situation according to a position of the track on a velocity value calculated on the basis of the movement displacement.

In still another embodiment of the present invention, a vehicle LiDAR system may include a LiDAR sensor configured to obtain sensor data on an object around a vehicle and a LiDAR signal processing device configured to, on the basis of cloud data obtained from the LiDAR sensor, match a plurality of points set to a track of a current step and a plurality of points set to a track of a previous step and determine a movement displacement of the track of the current step by measuring a movement displacement for each of matched points and determine a final velocity value by reflecting a displacement situation according to a position of the track on a velocity value calculated on the basis of the movement displacement.

For example, the LiDAR signal processing device may match the plurality of points set to the track of the current step and the plurality of points set to the track of the previous step, by setting at least two positions among midpoint positions of four surfaces of a measurement box of the track, a vertex position of a box closest to a host vehicle, and a tracking point position of the track, as points for measuring the movement displacement.

For example, the LiDAR signal processing device may match a point pair in which a distance between each of the plurality of points set to the track of the current step and each of the plurality of points set to the track of the previous step is minimized.

For example, the LiDAR signal processing device may extract a velocity value of the track of the previous step on the basis of history information including at least two steps, may assign preset weights to a velocity value calculated on the basis of the movement displacement and a velocity value calculated on the basis of the history information, respectively, and may determine a sum of weighted velocity values as the final velocity value.

In the vehicle LiDAR system and the velocity measuring method thereof according to the embodiments, when tracking an object, by calculating a velocity using various displacements capable of being obtained for the corresponding object, the accuracy of the velocity may be improved.

In addition, effects obtainable from the embodiments may not be limited by the above-mentioned effects. Other unmentioned effects may be clearly understood from the following description by those having ordinary skill in the technical field to which the present invention pertains.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of embodiments of the invention. In the drawings.

DETAILED DESCRIPTION OF ILLUSTRATIVE EMBODIMENTS

Figure 1:
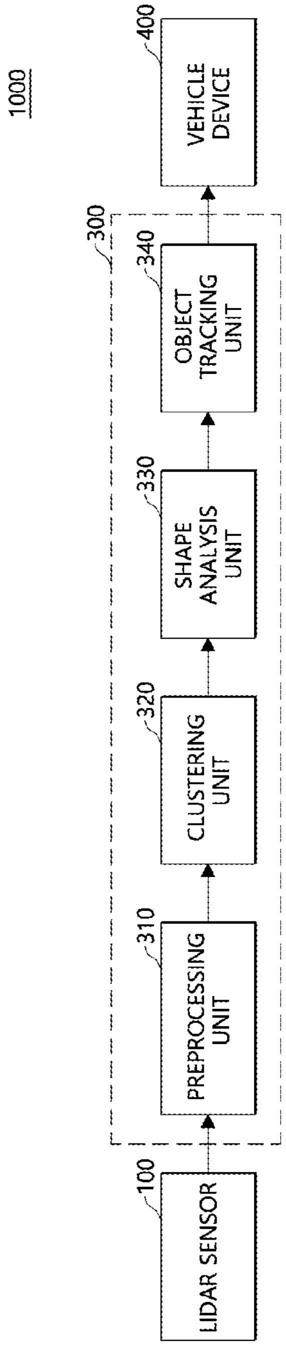
FIG. 1 is a block diagram of a vehicle LiDAR system according to an embodiment.

Hereinafter, embodiments will be described in detail with reference to the annexed drawings and description. However, the embodiments set forth herein may be variously modified, and it should be understood that there is no intent to limit the present invention to the particular forms disclosed, but on the contrary, the embodiments are to cover all modifications, equivalents, and alternatives falling within the spirit and scope of the present invention as defined by the claims. The embodiments are provided to more completely describe the present invention to those skilled in the art.

In the following description of the embodiments, it will be understood that, when each element is referred to as being formed "on" or "under" the other element, it can be directly "on" or "under" the other element or can be indirectly formed with one or more intervening elements therebetween.

Further, when an element is referred to as being formed "on" or "under" another element, not only the upward direction of the former element but also the downward direction of the former element may be included.

In addition, it will be understood that, although the relational terms, such as "first", "second", "upper", "lower", etc., may be used herein to describe various elements, these terms neither require nor connote any physical or logical relations between substances or elements or the order thereof, and are used only to discriminate one substance or element from other substances or elements.

Throughout the specification, when an element "includes" a component, this may indicate that the element does not exclude another component unless stated to the contrary, but can further include another component. In the drawings, parts irrelevant to the description are omitted in order to clearly describe embodiments of the present invention, and like reference numerals designate like parts throughout the specification.

In present embodiments, when measuring the velocity of an object using a LiDAR (Light Detection And Ranging) sensor, a plurality of points for displacement measurement may be set for one object to measure a displacement at each point, and the velocity of the corresponding object may be calculated on the basis of a plurality of measured displacements, whereby it is possible to improve the accuracy of the velocity.

Hereinafter, a vehicle LiDAR system and a velocity measuring method thereof according to embodiments will be described in detail with reference to the accompanying drawings.

FIG. 1 is a block diagram of a vehicle LiDAR system 1000 according to an embodiment.

Referring to FIG. 1, the vehicle LiDAR system 1000 may include a LiDAR sensor 100 and a LiDAR signal processing device 300.

After irradiating a laser pulse to an object within a measurement range, by measuring a time during which the laser pulse reflected from the object returns, the LiDAR sensor 100 may sense information on the object, such as a distance to the object from the LiDAR sensor 100 and the direction, velocity, temperature, material distribution and concentration property of the object. The object may be another vehicle, a person, a thing, etc. existing outside a vehicle (hereinafter, referred to as a 'host vehicle') to which the LiDAR sensor 100 is mounted, but the embodiment is not limited to a specific type of object. The LiDAR sensor 100 may include a transmitter (not shown) which transmits a laser pulse and a receiver (not shown) which receives the laser reflected back from the surface of an object existing within a sensor range. The receiver has a field of view (FOV) as a region that the LiDAR sensor 100 can observe at once without movement or rotation. The LiDAR sensor 100 outputs a sensing result as LiDAR data. The LiDAR data may be outputted in the form of point cloud data including a plurality of points for a single object.

The LiDAR signal processing device 300 may determine whether an object exists by receiving the LiDAR data, may recognize the shape of the object, may track the corresponding object, and may classify the type of the recognized object.

The LiDAR signal processing device 300 may include a preprocessing unit 310, a clustering unit 320, a shape analysis unit (or a segmenting unit) 330 and an object tracking unit (or a tracking unit, a tracking and classification unit or an object detection unit) 340. In the LiDAR signal processing device 300, the preprocessing unit 310 may be omitted. Alternatively, the vehicle LiDAR system 1000 according to an embodiment may include a LiDAR sensor 100, a LiDAR signal processing device 300, and a vehicle device 400.

The preprocessing unit 310 may remove erroneously detected data among the point cloud data inputted from the LiDAR sensor 100 to extract valid data. The preprocessing unit 310 may perform preprocessing by removing a point with a low intensity or reflectivity through filtering on the basis of information on the intensity or confidence of LiDAR data and may remove data erroneously detected due to reflection on the body of the host vehicle.

The clustering unit 320 groups point cloud data, including a plurality of points for an object obtained through the LiDAR sensor 100, into a meaningful shape unit according to a predetermined rule.

The shape analysis unit 330 generates information on a plurality of segment boxes for each channel by using a result clustered in the clustering unit 320. A segment box may mean a result of converting a clustered result into a geometrical box shape. For example, the segment box may be generated in the form of a box fitted to clustered point data. Each segment box may include information such as the width, length, position, and heading of the box.

The object tracking unit 340 may generate a track box (track) corresponding to an object to track, may track a segment box associated with the generated track, and may check the attribute information of the corresponding track. 'Association' means a process of selecting a box to be used to maintain the tracking of a target object that is currently being tracked, in the information on a plurality of segment boxes. Such association and attribute information checking processing may be performed every cycle, and this cycle may be referred to as a step. The object tracking unit 340 may accumulate position information and velocity information for each step of the object being tracked to preserve the position information and velocity information as history information. The history information may be stored in a memory for each step.

The object tracking unit 340 according to an embodiment may measure a movement displacement from the track position of a current step and the track position of a previous step on the basis of the history information stored in the memory. The object tracking unit 340 may measure a plurality of movement displacements by setting, for one track, a plurality of reference positions each for measuring a movement displacement. The object tracking unit 340 may extract an optimal movement displacement closest to a real movement displacement of the object by comparing the plurality of displacements measured for one track with preset conditions. A velocity according to the measured displacement may be calculated by dividing the displacement by a step time. Also, a velocity may be calculated using only the history information. Accordingly, it is also possible to determine a final velocity as the weighted sum of the velocity according to the measured displacement and the velocity according to the history information. A velocity calculating method of the object tracking unit 340 will be described later in detail with reference to FIGS. 4 and 5.

The vehicle device 400 may control a driving state according to the track information outputted from the object tracking unit 340.

Figure 2:
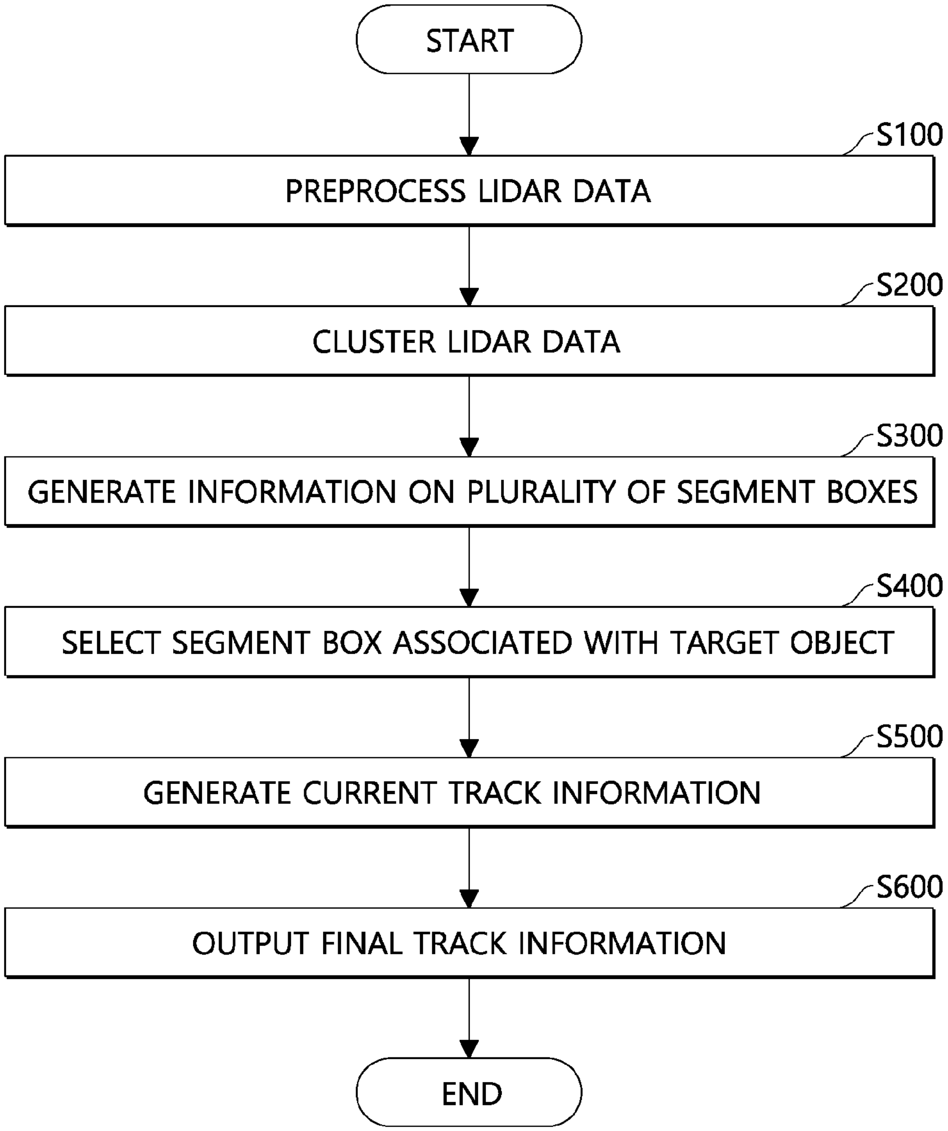
FIG. 2 is a schematic control flowchart of the vehicle LiDAR system according to an embodiment.

FIG. 2 is a schematic control flowchart of the vehicle LiDAR system according to an embodiment and illustrates the control flow of the LiDAR signal processing device 300.

The LiDAR signal processing device 300 preprocesses the point cloud-type LiDAR data inputted from the LiDAR sensor 100 (S100). The preprocessing unit 310 may remove erroneously detected data according to information on the intensity and confidence of the LiDAR data.

Thereafter, the preprocessed LiDAR data is clustered into a meaningful shape unit according to a predetermined rule (S200).

Information on a plurality of segment boxes is generated using a clustered result (S300). Information on a segment box may mean at least one of the width, the length, the position and the direction (heading) of the segment box.

A segment box associated with an object being tracked is selected among the plurality of segment boxes (S400). In other words, a segment box determined to have been obtained from the object being tracked is selected.

Current track information is generated on the basis of the associated segment box (S500). The current track information may include track velocity information.

Final track information is outputted to a vehicle device (S600).

The LiDAR signal processing device 300 according to an embodiment, which performs the above-described object tracking function, may extract an optimal movement displacement closest to a real movement displacement of the object on the basis of a plurality of displacements when calculating a track velocity, and thereby, may calculate a velocity according to the measured displacement. In addition, since a velocity may be calculated using only history information, it is possible to determine a final velocity as the weighted sum of the velocity according to the measured displacement and the velocity according to the history information.

Figure 3:
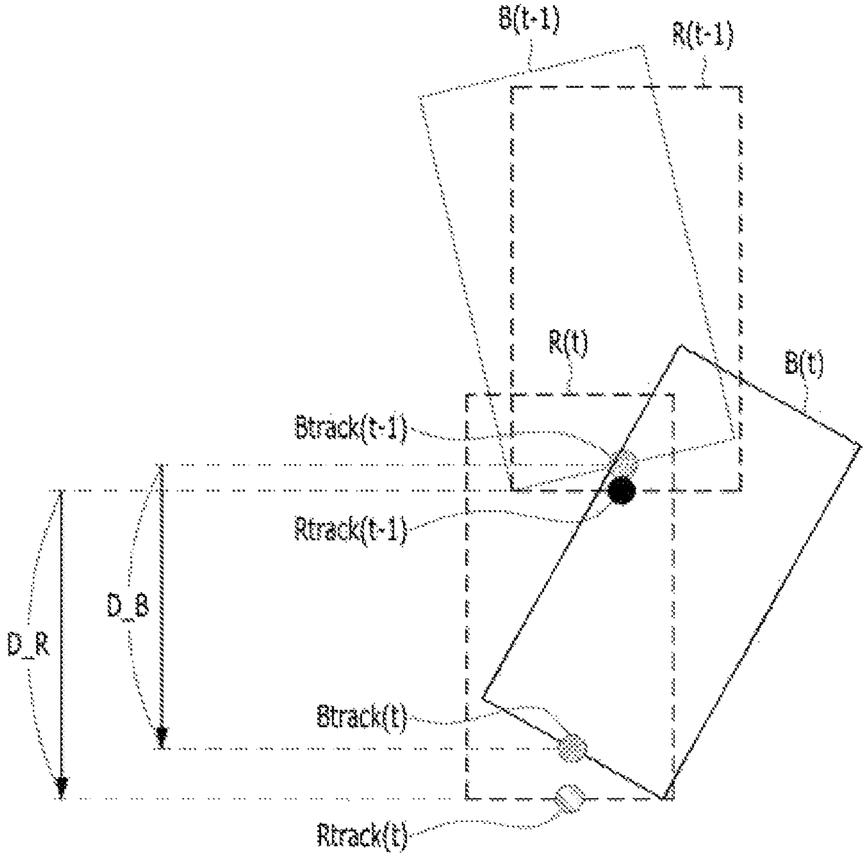
FIG. 3 is a diagram for explaining a velocity calculation method by a comparative example.

FIG. 3 is a diagram for explaining a velocity calculation method by a comparative example and illustrates a case where the velocity of an object is calculated by setting a single reference point on a track. In FIG. 3, information at a current time point is indicated by 't,' and information at a previous time point is indicated by 't−1.'

When detecting an object using LiDAR, due to various causes such as LiDAR performance and surrounding environment, there may be a difference between a real object and an object recognized on the basis of LiDAR data. Namely, as shown in FIG. 3, at a current time point (t), the shape of a track box B(t) extracted on the basis of LiDAR data and the shape of a real object R(t) may not match. Also, at a previous time point (t−1), there may be a difference between the shape of a track box B(t−1) extracted on the basis of LiDAR data and the shape of a real object R(t−1).

When only one point is set to measure the displacement of an object from the previous time point (t−1) to the current time point (t), the point of the real object R(t−1) at the previous time point (t−1) may be set as Rtrack(t−1), and the point of the real object R(t) at the current time point (t) may be set as Rtrack(t). Accordingly, the displacement of a real object R from the previous time point (t−1) to the current time point (t) may be measured as a distance D_R between the points Rtrack(t−1) and Rtrack(t).

The displacement of a track box B from the previous time point (t−1) to the current time point (t) may be measured as a distance D_B between points Btrack(t−1) and Btrack(t). Since there is a difference between the shape of the track box B and the shape of the real object R, there may also occur a difference between the displacement D_R of the real object R and the displacement D_B of the track box B. In particular, as the difference in shape between the real object R and the track box B increases, the difference in distance between points increases, and thus, the error of a displacement calculated on the basis of LiDAR data may increase.

In order to reduce such an error, an embodiment illustrates a method of reducing the error of a displacement by setting a plurality of points for measuring the displacement.

Figure 4:
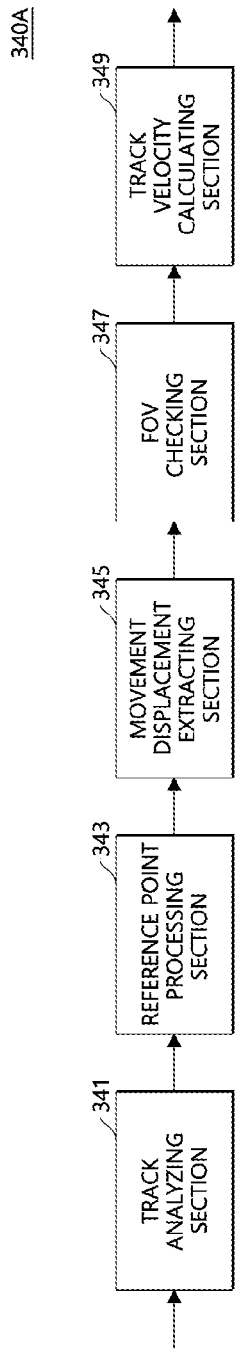
FIG. 4 is a block configuration diagram for the velocity measurement of the vehicle LiDAR system according to an embodiment.

FIG. 4 is a block configuration diagram for the velocity measurement of the vehicle LiDAR system according to an embodiment. FIG. 4 illustrates a case where a block 340A for velocity measurement according to an embodiment is configured as the object tracking unit 340 of FIG. 1, but the present invention is not limited thereto.

Referring to FIG. 4, a configuration for velocity measurement according to an embodiment includes a track analyzing section 341, a reference point processing section 343, a movement displacement extracting section 345, a FOV checking section 347, and a track velocity calculating section 349. When calculating a velocity according to the embodiment, the velocity of a track may be calculated using track data for each step stored in a memory in which the history information of the track is stored.

The track analyzing section 341 may analyze lateral movement information of a track, transient information, stability information of the track, and so forth. When analyzing lateral movement information of a track, the track analyzing section 341 may determine whether the track moves laterally and a lateral movement direction on the basis of heading information of the track. Lateral movement information of a track may be used to extract a velocity that conforms to a lateral movement situation when a velocity is extracted. When analyzing transient information, the track analyzing section 341 may make a rough determination for a stationary structure, and in the case of transient, the transient may be used to determine a stop in movement/stop. The track analyzing section 341 may determine, as transient in a box generation module, a track in which a long shape is divided into two parts, a track which is classified as a road edge, a track which is classified as an unknown object and has a length exceeding 20 m, a track which has a length or width exceeding 20 m and a track which has an abnormal region whose region change rate decreases to at least 1/30 or increases to at least 30 times. The track analyzing section 341 may set a velocity status to 2 when determining transient.

In the case of a transient track, the state of a velocity function is set to transient, and a velocity confidence level is set to '1.'

When analyzing stability information of a track, the track analyzing section 341 calculates the area of a region and the displacement of a center point for each track of each step to calculate a region change rate between steps. The track analyzing section 341 may determine that the stability of a corresponding track is low when a region change rate between steps is equal to or greater than a reference value.

The reference point processing section 343 may compare, for a plurality of points set as references for displacement measurement, positions of the points in the current step and positions of the points in the previous step, and thereby, may update positions of points whose matching is checked in the current step.

The movement displacement extracting section 345 may extract displacements for the points which match points, respectively, of the previous step in the current step. The movement displacement extracting section 345 may set a threshold that a displacement between steps may have and may determine an abnormal track when a displacement between steps exceeds the threshold. Information on tracks determined as abnormal tracks may be excluded when calculating a velocity.

The FOV checking section 347 may determine the position of a track with respect to a FOV. The FOV checking section 347 determines a track that is positioned at the boundary of the FOV and a track that is positioned inside the FOV but is screened by the track positioned at the boundary of the FOV.

The track velocity calculating section 349 may calculate the velocity of a track on the basis of information analyzed by the track analyzing section 341, the reference point processing section 343, the movement displacement extracting section 345, and the FOV checking section 347. The track velocity calculating section 349 extracts the displacement of a track which is determined to be closest to the displacement of a real object on the basis of lateral movement information of the track, transient information, stability information of a track region, threshold information of a movement displacement, FOV boundary information, and so forth. The track velocity calculating section 349 may calculate a current velocity on the basis of the extracted displacement of the track. Also, by extracting a current velocity from history information of the track, a final current velocity may be determined in a method of combining a history-based current velocity and an extracted displacement-based current velocity.

Figure 5:
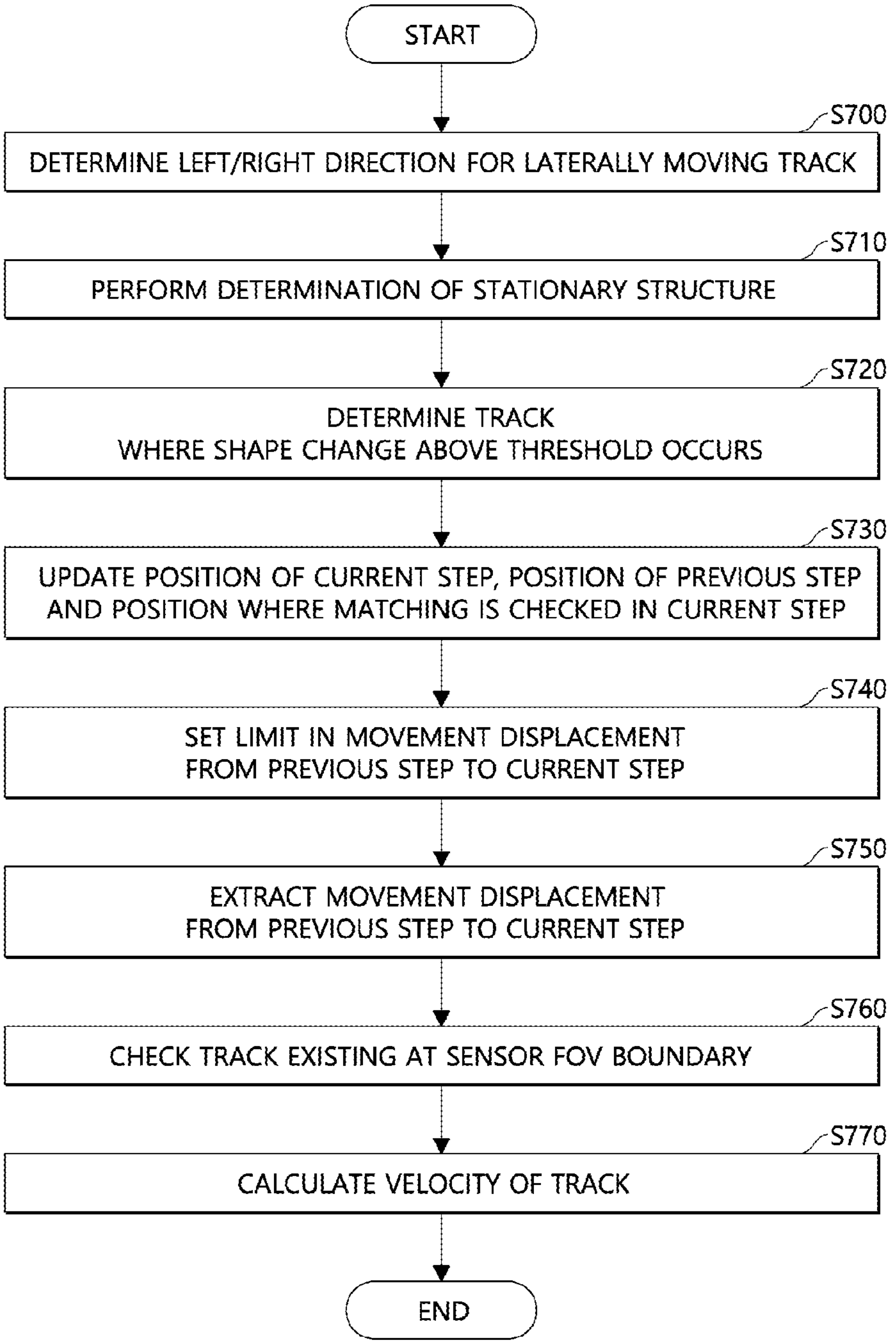
FIG. 5 is a flowchart of a velocity measuring method of a vehicle LiDAR system according to an embodiment.

FIG. 5 is a flowchart of a velocity measuring method of a vehicle LiDAR system according to an embodiment, and FIGS. 6 to 12 are diagrams for explaining respective control acts.

Figure 6:
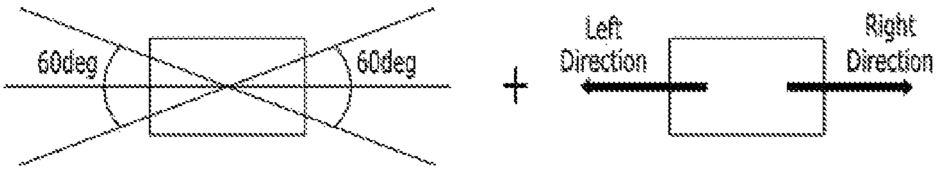
FIG. 6 is a diagram for explaining a method of determining a lateral movement according to an embodiment.

Referring to FIG. 5, whether a track laterally moves and a lateral movement direction are determined (S700). On the basis of the heading angle and movement direction of a track, a lateral movement and a lateral movement direction may be determined. FIG. 6 is a diagram for explaining a method of determining whether a lateral movement is made, by combining the heading angle and movement direction of a track. Referring to FIG. 6, in the case of a left/right direction, determination may be made through an inputted signal from an internal direction tracking function. A criterion for determining matching on the basis of a heading angle may be determined, for example, up to ±30 deg on the basis of 90 deg. That is to say, in the case of the left direction and a heading angle of 60 deg to 120 deg, determination may be made as a left lateral movement track. A track determined as a lateral movement track may be used to extract a velocity that conforms to a lateral movement situation when a velocity is extracted.

By performing determination for a stationary structure, in the case of transient, the transient is applied to determine a stopped state between a moving state and the stopped state (S710). Whether a structure is a stationary structure may be determined by analyzing the shape of a track. For example, a track which is classified as a road edge, a track which is an unknown object and has a length equal to or larger than a reference length, for example, 20 m, a track which has a length or width exceeding the reference length, for example, 20 m, and a track which has an abnormal region whose region change rate is equal to or greater than a reference, that is, decreases to at least 1/30 or increases to at least 30 times, may be determined as a stationary structure. When determining transient, a velocity status may be set to 2. In the case of transient, the status of a velocity function may be set to "transient," and a velocity confidence level may be set to 1.

Referring to FIG. 5, a track in which a shape change equal to or greater than a threshold occurs is determined (S720). A track in which a shape change equal to or greater than the threshold occurs may be determined as an unstable track. Even when the same object is tracked, the shape of a track may be differently recognized in each step. However, when the difference is excessively large, it may be determined that the corresponding track is in an abnormal state. Thus, by analyzing the history of a track having an age of 2 or more, it may be determined whether a shape change equal to or greater than the threshold occurs in the track.

Figure 7:
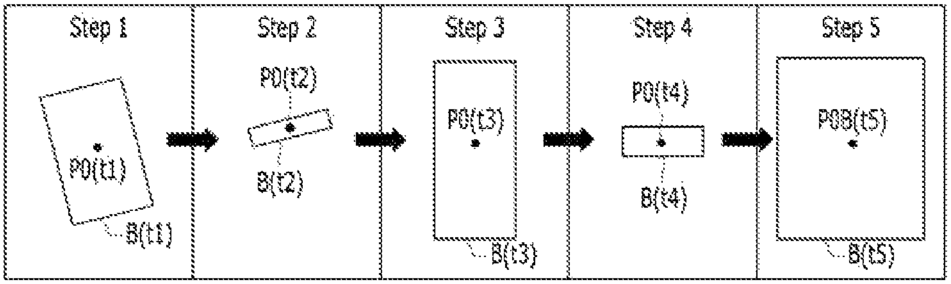
FIG. 7 is a diagram for explaining a method of analyzing a shape change of a track according to an embodiment.

FIG. 7 illustrates a method of analyzing a shape change using track boxes B(t1) to B(t5) of a first step (step 1) to a fifth step (step 5) stored in a memory. Whether a shape change equal to greater than the threshold has occurred may be determined by checking a region change rate between boxes and the displacement of a center point P0 in adjacent steps. In other words, a region change rate may be measured by measuring the difference between the region size of the track box B(t1) of the first step (step 1) and the region size of the track box B(t2) of the second step (step 2). The displacement of the center point P0 may be measured by comparing the position of a center point P0(*t*1) of the track box B(t1) of the first step (step 1) and the position of a center point P0(*t*2) of the track box B(t2) of the second step (step 2). Thereafter, it is determined whether the measured region change rate and the displacement of the center point P0 are equal to or greater than reference values. In the same way, it is determined whether the region change rate and the displacement of the center point of the track box B(t2) of the second step (step 2) and the track box B(t3) of the third step (step 3) are equal to or greater than the reference values, it is determined whether the region change rate and the displacement of the center point of the track box B(t3) of the third step (step 3) and the track box B(t4) of the fourth step (step 4) are equal to or greater than the reference values, and it is determined whether the region change rate and the displacement of the center point of the track box B(t4) of the fourth step (step 4) and the track box B(t5) of the fifth step (step 5) are equal to or greater than the reference values. Through the above process, by counting a case where a region change rate is equal to or greater than a threshold, when a count exceeds a predetermined number of times, a corresponding track may be determined as an unstable track.

Referring to FIG. 5, the position of a current step and the position of a previous step are checked, and the position of a point where matching is checked in the current step is updated (S730).

Figure 8:
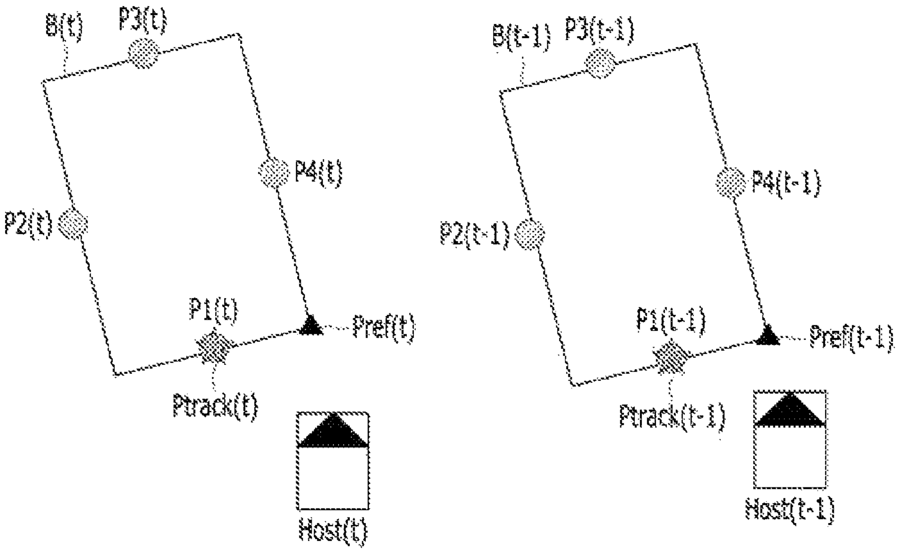
FIG. 8 is a diagram illustrating a reference point for measuring a movement displacement according to an embodiment.

FIG. 8 shows points for measuring a movement displacement in a current step and points for measuring a movement displacement in a previous step. In FIG. 8, information at a current time point is indicated by 't,' and information at a previous time point is indicated by 't−1.' As a track box to be used, not a final track box for which tracking is completed but a tracked measurement box, that is, box information of a measurement value, is applied.

Referring to FIG. 8, six points for measuring a displacement in the current step may be set. Midpoints P1(*t*), P2(*t*), P3(*t*) and P4(*t*) of the four surfaces of a track box B(t) may be set as points, a vertex closest to a host vehicle Host(t) among the vertices of the track box B(t) may be set as a reference point Pref(t), and a tracking point of a track may be set as a reference tracking point Ptrack(t) for measurement.

Points for measuring a displacement in the previous step may be extracted on the basis of information stored in five steps. Respective midpoints P1(*t*−1), P2(*t*−1), P3(*t*−1) and P4(*t*−1) of the four surfaces of a track box B(t−1), a reference point Pref(t−1) closest to a host vehicle Host(t−1), and a tracking point Ptrack(t−1) for measurement may be set.

The reference points exemplified above are given to facilitate the understanding of embodiments of the present invention, and various methods of setting reference points may be applied.

Figure 9:
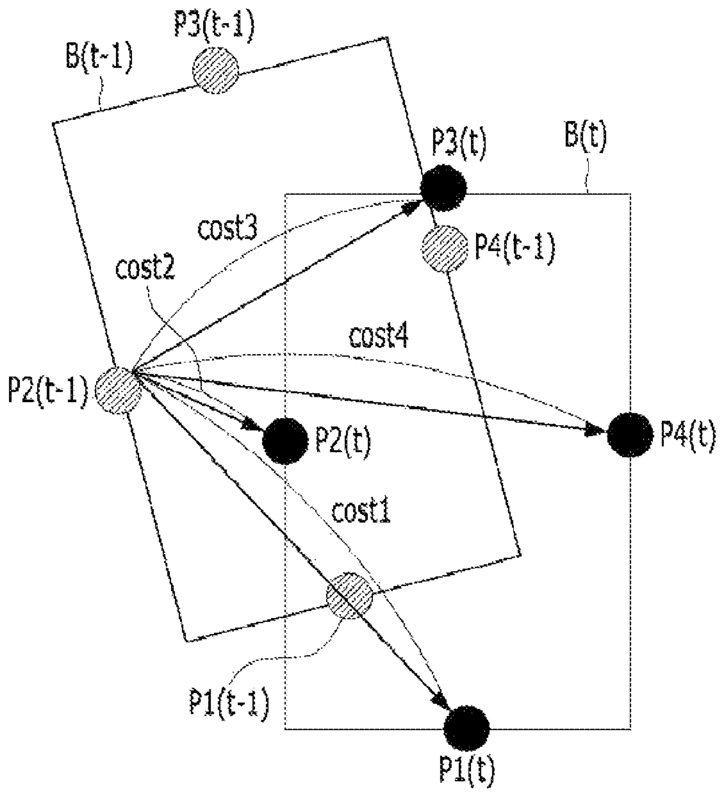
FIG. 9 is a diagram for explaining a point matching method according to an embodiment.

FIG. 9 is a diagram for explaining a method of matching the points of the track box B(t) of the current step and the track box B(t−1) of the previous step.

In order to match the points P1(*t*), P2(*t*), P3(*t*) and P4(*t*) set at the midpoints of the four surfaces of the track box B(t) of the current step, distances from the midpoints P1(*t*−1), P2(*t*−1), P3(*t*−1) and P4(*t*−1) of the track box B(t−1) of the previous step are calculated on the basis of the midpoint of any one surface, and matching may be made to a midpoint of the track box B(t−1) of the previous step which is positioned at a closest distance. All the four points may be matched by performing the same process for the four surfaces.

Referring to FIG. 9, when finding a matching point of the midpoint P2(*t*) of the left surface of the track box B(t) of the current step, distance values between the midpoint P2(*t*) and the midpoints P1(*t*−1), P2(*t*−1), P3(*t*−1) and P4(*t*−1) of the track box B(t−1) of the previous step are calculated. A distance value cost1 between P2(*t*) and P1(*t*−1), a distance value cost2 between P2(*t*) and P2(*t*−1), a distance value cost3 between P2(*t*) and P3(*t*−1) and a distance value cost4 between P2(*t*) and P4(*t*−1) may be respectively calculated. Thereafter, the point P2(*t*−1) of the track box B(t−1) of the previous step which has a smallest value among the values of cost1 to cost4, that is, a closest distance, may be matched to P2(*t*) of the track box B(t) of the current step.

By performing the same process for P1(*t*), P3(*t*) and P4(*t*) and thereby matching points of the track box B(t−1) of the previous step with closest distances, points may be matched to each other even in the case where the heading angles of the track box B of the current step and the track box B(t−1) of the previous step are different, that is, even when the track boxes B(t) and B(t−1) are misaligned.

After the point matching is completed, a threshold of movement displacement from the previous step to the current step is set (S740). The threshold of movement displacement is to determine the reliability of a track, and may be set according to various conditions such as a driving condition and so forth. For example, the threshold of movement displacement may be initially set on the basis of a maximum system velocity, and the threshold may be set by setting a weight in consideration of velocity inaccuracy. In addition, the threshold may be set in consideration of a movement distance during deceleration and a movement distance reflecting the velocity of a host vehicle. When the shape change of a track is severe, the threshold is less meaningful, and thus a weight may be applied to some extent. When the confidence level of a previous history-based velocity is high, the threshold may be set small, and in the case of a track whose shape change is unstable as an age is less than 10, the threshold may be set high. Moreover, in the case of a track that is previously determined to be unstable, the threshold may be set small.

Referring to FIG. 5, after setting the threshold, a movement displacement from the previous step to the current step is extracted (S750). In order to calculate the movement displacement from the previous step to the current step, a displacement between reference points of the previous step and the current step may be calculated.

Figure 10:
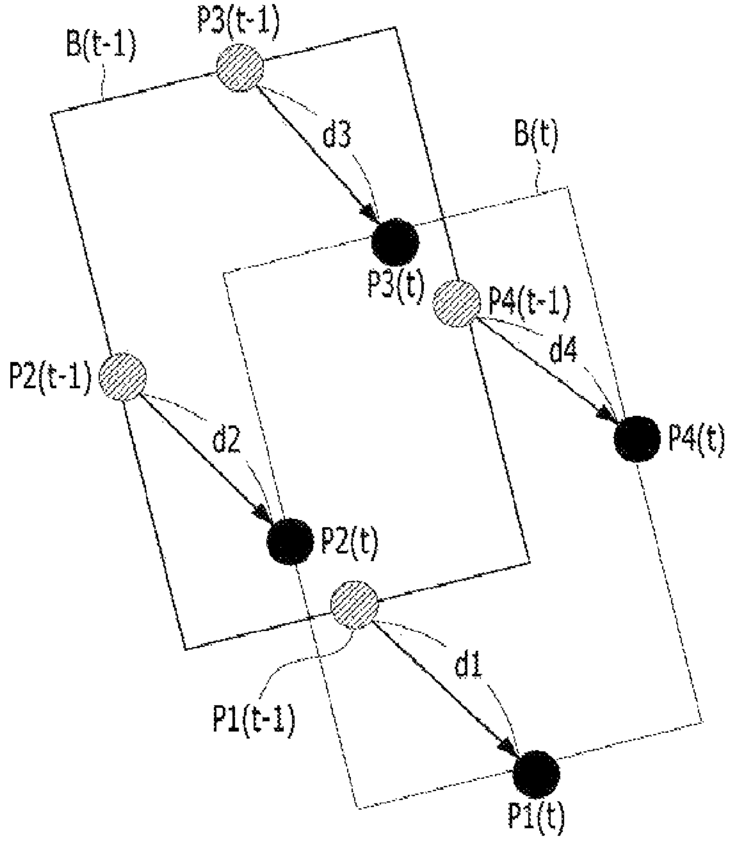
FIG. 10 is a diagram for explaining a movement displacement calculating method according to an embodiment.

FIG. 10 is a diagram for explaining a method of calculating a movement displacement from a previous step to a current step. Referring to FIG. 10, the movement displacements of the points P1(*t*−1), P2(*t*−1), P3(*t*−1) and P4(*t*−1) of the track box B(t−1) of the previous step matched to the points P1(*t*), P2(*t*), P3(*t*) and P4(*t*), respectively, of the track box B(t) of the current step may be calculated to calculate a movement displacement. Namely, a movement displacement d1 between P1(*t*) and P1(*t*−1) matched thereto, a movement displacement d2 between P2(*t*) and P2(*t*−1) matched thereto, a movement displacement d3 between P3(*t*) and P3(*t*−1) matched thereto and a movement displacement d4 between P4(*t*) and P4(*t*−1) matched thereto may be respectively calculated. Although not shown in FIG. 10, movement displacements may be calculated in the same way even for the reference point Pref(t) and the tracking point Ptrack(t) as the remaining points set to measure a movement displacement.

In order to increase the accuracy of a calculated movement displacement, the movement displacement may be calculated by applying an ICP (iterative closest point) filter. The ICP filter may match a set of points in which any one point selected in the track box B(t) of the current step and any one point selected in the track box B(t−1) of the previous step are combined to have a minimum distance. After matching the points of the track box B(t) of the current step and the points of the track box B(t−1) of the previous step by applying the ICP filter, movement displacements thereof may be calculated.

Referring to FIG. 5, a track existing at the boundary of the FOV of a sensor is checked (S760). A front-side LiDAR sensor has a FOV as a region that the LiDAR sensor can observe at once without movement or rotation. Since an object existing at the boundary of the FOV is sensed at only a partial region thereof, the accuracy of track information of the object decreases. Therefore, it is necessary to determine whether a track is positioned at the boundary of the FOV.

Figure 11:
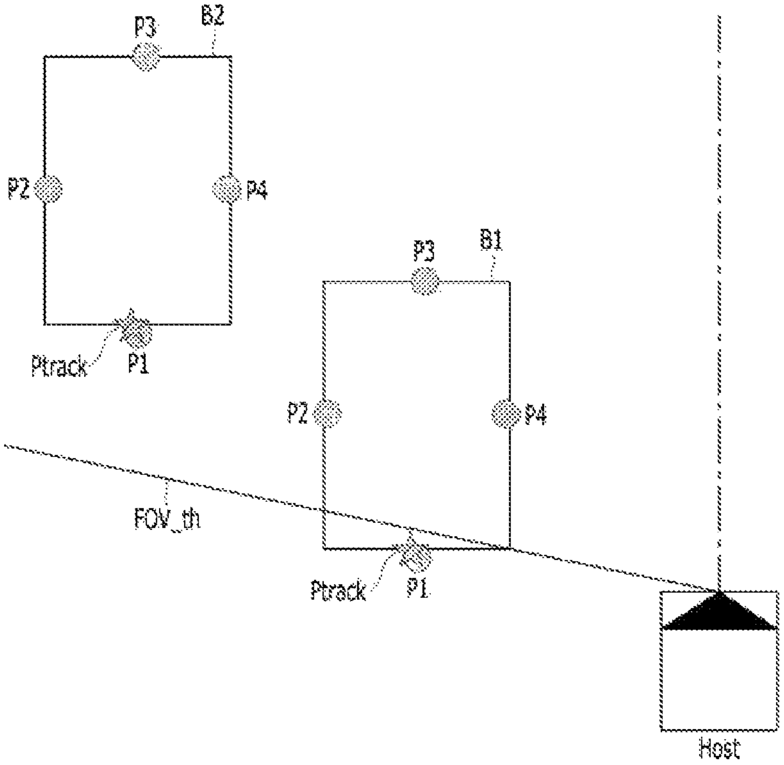
FIG. 11 is a diagram for explaining a method of checking a track existing at the boundary of a field of view (FOV)

FIG. 11 is a diagram for explaining a method of checking a track existing at the boundary of a FOV.

Referring to FIG. 11, a first track box B1 and a second track box B2 may exist in front of a host vehicle Host. The boundary of the FOV of the host vehicle Host is denoted as FOV_th. Whether tracks are at the boundary of the FOV may be checked using u8_IsFOVLimit and u8_IsFOVLimitExtended signals, which are FOV determination signals used in a LiDAR system.

The u8_IsFOVLimit signal is a signal that determines a state in which an object is positioned at the boundary FOV_th of the FOV and thus a partial region thereof is not sensed. A track in which the sensing value of the u8_IsFOVLimit signal is '1' may be determined as a track that exists at the boundary FOV_th of the FOV. Since the first track box B1 exists at the boundary FOV_th of the FOV, the sensing value of the u8_IsFOVLimit signal is sensed as '1.' Accordingly, it may be recognized that the first track box B1 is positioned at the boundary FOV_th of the FOV.

The u8_IsFOVLimitExtended signal is a signal which determines a track screened by a track whose u8_IsFOVLimit signal is '1.' That is to say, the u8_IsFOVLimitExtended signal is a signal which determines a state in which an object exists inside the FOV but a partial region thereof is not sensed by being screened by a track whose u8_IsFOVLimit signal is '1.' Although the second track box B2 exists inside the FOV, the second track box B2 is screened by the first track box B1 which is positioned at the boundary FOV_th of the FOV, and thus, the sensing value of the u8_IsFOVLimitExtended signal is sensed as '1.' Accordingly, it may be recognized that the second track box B2 is screened by the first track box B1.

In the case of a track (outside a region of interest (ROI)) for which a FOV determination logic is not executed, the angle of a box position may be determined and checked on the basis of a threshold angle of the FOV, for example, 84 deg or more.

Referring to FIG. 5, the velocity of the track may be finally calculated (S770). Since the situation of a displacement is different depending on the position of a track, a velocity may be extracted by extracting an optimal displacement in conformity with a situation. For example, a displacement may be extracted by distinguishing a sensor occlusion situation, a situation with a FOV boundary flag, a lateral movement situation, a situation in which the displacement of a point is unstable because an update age is 2, and a general situation in the FOV.

Figure 12:
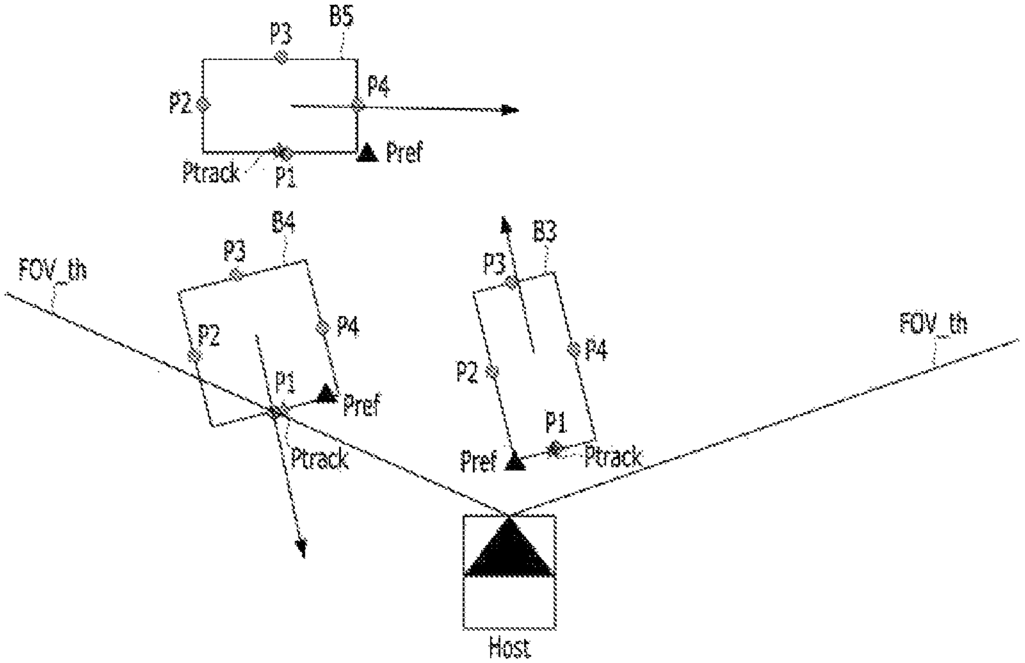
FIG. 12 is a diagram showing points whose displacements are stable according to the direction of a track.

FIG. 12 is a diagram showing points whose displacements are stable according to the direction of a track.

Referring to FIG. 12, in the case of a target inside the FOV such as a third track B3, a tracking measurement value and a reference displacement Ref may be stable. In the case of a track, positioned at the boundary of the FOV, such as a fourth track B4, the displacements of points P3 and P4 positioned inside the FOV may be stable. In the case of a laterally moving track such as a fifth track B5, the displacements of points P1 and Pref in a longitudinal direction may be stable, and the displacements of points P4 and Pref in a lateral direction may be stable.

Based on the above information, it is possible to finally calculate a displacement measurement-based velocity. When calculating a velocity, data whose velocity status is set to '3' is unstable, and thus, a previous velocity is used. Even when a threshold in displacement is exceeded, a previous velocity is used because it is an unstable state.

A velocity according to a measured displacement may be calculated by dividing the displacement by a step time. Also, a velocity may be calculated using only history information. Accordingly, it is also possible to determine a final velocity as the weighted sum of the velocity according to the measured displacement and the velocity according to the history information. This may be expressed by the following equation.

Measure Vx/Vy=average Vx/Vy*weight_1+current velocity*weight_2 Equation

Herein, a weight may be used by being dividedly tuned into a lateral movement section, a rotation section, and a low-velocity section. Also, as a velocity according to history information, a value stored up to a previous step may be used, and when an update age is 2, the velocity of a current step may be exceptionally used as a velocity. In the case of a track positioned at the boundary of the FOV, a lateral velocity exceptionally set to '0' may be applied. Weight1 may be set to 0.4 when a velocity is less than 10 kph, may be set to 0.6 when it is a screened state or the confidence of a velocity is high, and may be set to 0.1 in a situation where a host vehicle rotates and a target laterally moves. These weight values as values determined by simulating velocity characteristics in various situations may be changed according to a system setting method, and various conditions may be added or omitted in addition to the above-described weights and conditions.

As is apparent from the above description, in the present embodiments, when measuring the velocity of an object using a LiDAR sensor, a plurality of points for displacement measurement may be set for one object to measure a displacement at each point, and the velocity of the corresponding object may be calculated on the basis of a plurality of measured displacements, whereby it is possible to improve the accuracy of the velocity.

What is claimed is:

1. A vehicle LiDAR system comprising:
- a LiDAR sensor configured to obtain sensor data on an object around a vehicle; and
- a LiDAR signal processor configured to, based on cloud data obtained from the LiDAR sensor, match a plurality of points set to a track of a current step and a plurality of points set to a track of a previous step, and determine a movement displacement of the track of the current step by measuring a movement displacement for each of the matched points and determine a final velocity value by reflecting a displacement situation according to a position of the track on a velocity value calculated based on the movement displacement.

2. The vehicle LiDAR system of claim 1, wherein the LiDAR signal processor is configured to match the plurality of points set to the track of the current step and the plurality of points set to the track of the previous step by setting at least two positions among midpoint positions of four surfaces of a measurement box of the track, a vertex position of a box closest to a host vehicle, and a tracking point position of the track as points for measuring the movement displacement.

3. The vehicle LiDAR system of claim 2, wherein the LiDAR signal processor is configured to match a point pair in which a distance between each of the plurality of points set to the track of the current step and each of the plurality of points set to the track of the previous step is minimized.

4. The vehicle LiDAR system of claim 1, wherein the LiDAR signal processor is configured to:
- extract a velocity value of the track of the previous step based on history information including at least two steps;
- assign preset weights to a velocity value calculated based on the movement displacement and a velocity value calculated based on the history information, respectively; and
- determine a sum of weighted velocity values as the final velocity value.

5. The vehicle LiDAR system of claim 1, wherein the LiDAR signal processor is configured to match the plurality of points set to the track of the current step and the plurality of points set to the track of the previous step by calculating points of the track of the previous step based on history information including at least two steps.

6. The vehicle LiDAR system of claim 1, wherein the LiDAR signal processor is configured to determine whether the track of the current step laterally moves, based on heading information and a moving direction of the track of the current step, to determine the final velocity value according to a lateral movement situation.

7. The vehicle LiDAR system of claim 1, wherein the LiDAR signal processor is configured to:
- check, based on history information of the track of the previous step, a region change rate of the track between steps and a movement displacement of a center point; and
- decrease, when the region change rate of the track and the movement displacement of the center point are equal to or greater than thresholds, a reflection rate of the corresponding track when determining the final velocity value.

8. The vehicle LiDAR system of claim 1, wherein the LiDAR signal processor is configured to:
- determine whether the track of the current step is a track positioned at a boundary of a field of view; and
- determine the final velocity value by setting a lateral movement velocity to o when the track of the current step is positioned at the boundary of the field of view.

9. A velocity measuring method of a vehicle LiDAR system, wherein the vehicle LiDAR system comprises a LiDAR sensor configured to obtain sensor data on an object around a vehicle and a LiDAR signal processor configured to process cloud data obtained from the LiDAR sensor, the method comprising:
- matching, by the LiDAR signal processor, a plurality of points set to a track of a current step and a plurality of points set to a track of a previous step; and
- determining, by the LiDAR signal processor, a movement displacement of the track of the current step by measuring a movement displacement for each of the matched points and determining a final velocity value by reflecting a displacement situation according to a position of the track on a velocity value calculated based on the movement displacement.

10. The method of claim 9, wherein matching the plurality of points set to the track of the current step and the plurality of points set to the track of the previous step comprises calculating points of the track of the previous step based on history information including at least two steps.

11. The method of claim 9, wherein matching the plurality of points set to the track of the current step and the plurality of points set to the track of the previous step comprises setting at least two positions among midpoint positions of four surfaces of a measurement box of the track, a vertex position of a box closest to a host vehicle, and a tracking point position of the track, as points for measuring the movement displacement.

12. The method of claim 11, wherein matching the plurality of points set to the track of the current step and the plurality of points set to the track of the previous step comprises matching a point pair in which a distance between each of the plurality of points set to the track of the current step and each of the plurality of points set to the track of the previous step is minimized.

13. The method of claim 9, wherein determining the movement displacement of the track of the current step by measuring the movement displacement for each of the matched points and determining the final velocity value by reflecting the displacement situation according to the position of the track on the velocity value calculated based on the movement displacement comprises determining whether the track of the current step laterally moves, based on heading information and a moving direction of the track of the current step, to determine the final velocity value according to a lateral movement situation.

14. The method of claim 9, wherein determining the movement displacement of the track of the current step by measuring the movement displacement for each of the matched points and determining the final velocity value by reflecting the displacement situation according to the position of the track on the velocity value calculated based on the movement displacement comprises:

checking, based on history information of the track of the previous step, a region change rate of the track between steps and a movement displacement of a center point; and decreasing, when the region change rate of the track and the movement displacement of the center point are equal to or greater than thresholds, a reflection rate of the corresponding track when determining the final velocity value.

15. The method of claim 9, wherein determining the movement displacement of the track of the current step by measuring the movement displacement for each of the matched points and determining the final velocity value by reflecting the displacement situation according to the position of the track on the velocity value calculated based on the movement displacement comprises:

determining whether the track of the current step is a track positioned at a boundary of a field of view; and determining the final velocity value by setting a lateral movement velocity to o when the track of the current step is positioned at the boundary of the field of view.

16. The method of claim 9, wherein determining the movement displacement of the track of the current step by measuring the movement displacement for each of the matched points and determining the final velocity value by reflecting the displacement situation according to the position of the track on the velocity value calculated based on the movement displacement comprises:

extracting a velocity value of the track of the previous step based on history information including at least two steps;

assigning preset weights to a velocity value calculated based on the movement displacement and a velocity value calculated based on the history information, respectively; and determining a sum of weighted velocity values as the final velocity value.

17. A non-transitory computer-readable recording medium recorded with a program for executing a velocity measuring method of a vehicle LiDAR system, wherein the vehicle LiDAR system comprises a LiDAR sensor configured to obtain sensor data on an object around a vehicle and a LiDAR signal processor configured to execute the program to process cloud data obtained from the LiDAR sensor, the program implementing:

a function of matching a plurality of points set to a track of a current step and a plurality of points set to a track of a previous step; and a function of determining a movement displacement of the track of the current step by measuring a movement displacement for each of the matched points and determining a final velocity value by reflecting a displacement situation according to a position of the track on a velocity value calculated based on the movement displacement.

* * * * *